US010762166B1

(12) United States Patent
Winston et al.

(10) Patent No.: US 10,762,166 B1
(45) Date of Patent: Sep. 1, 2020

(54) ADAPTIVE ACCELERATED YIELD ANALYSIS

(71) Applicant: INTERNATIONAL BUSINESS MACHINES CORPORATION, Armonk, NY (US)

(72) Inventors: David Winston, Charlotte, NC (US); Pravin Kamdar, Austin, TX (US); Tong Li, Austin, TX (US); Richard Daniel Kimmel, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/434,334

(22) Filed: Jun. 7, 2019

(51) Int. Cl.
G06F 17/18 (2006.01)
G06F 30/367 (2020.01)
G06N 5/04 (2006.01)
G06N 20/00 (2019.01)

(52) U.S. Cl.
CPC .......... *G06F 17/18* (2013.01); *G06F 30/367* (2020.01); *G06N 5/04* (2013.01); *G06N 20/00* (2019.01)

(58) Field of Classification Search
CPC ......... G06F 17/18; G06F 30/367; G06N 5/04; G06N 20/00
See application file for complete search history.

(56) References Cited

U.S. PATENT DOCUMENTS

| 8,175,830 | B2 | 5/2012 | Hosking |
| 8,219,355 | B2 | 7/2012 | Tiwary et al. |
| 8,479,126 | B1 | 7/2013 | Liu et al. |
| 8,751,421 | B2 | 6/2014 | Anderson et al. |
| 9,483,602 | B2 | 11/2016 | McConaghy et al. |
| 9,524,365 | B1 | 12/2016 | Liu et al. |
| 9,576,085 | B2 | 2/2017 | Joshi et al. |
| 2007/0266358 | A1 | 11/2007 | Tohyama |
| 2009/0248370 | A1 | 10/2009 | Rutenbar et al. |
| 2009/0248387 | A1 | 10/2009 | Singhee et al. |
| 2016/0063156 | A1 | 3/2016 | Joshi et al. |
| 2017/0169147 | A1 | 6/2017 | McGaughy et al. |
| 2018/0074124 | A1 | 3/2018 | Xu et al. |

OTHER PUBLICATIONS

IBM, "Method of Robust and Accurate Monte Carlo Simulations for Yield Improvement", IPCOM000176541D, Nov. 14, 2008, pp. 1-6.

*Primary Examiner* — Stacy Whitmore
(74) *Attorney, Agent, or Firm* — Cantor Colburn LLP; Erik Johnson

(57) ABSTRACT

Methods, systems, can computer program products for optimizing statistical method of computing output yields are provided. Aspects include determining a target criteria of a system for statistical analysis, based on the target criteria, determining a statistical analysis algorithm for the simulation, determining a block size for a plurality of statistical samples of the system for a parallelization of the statistical analysis algorithm, generating the plurality of statistical samples of the system, simulating the plurality of statistical samples of the system to determine one or more output yields, calculating a confidence interval for each of the one or more output yields, wherein the confidence interval comprises a lower bound, comparing the lower bound to a threshold standard deviation of a probability density function, and adjusting the block size for the plurality of statistical samples based on determining that the lower bound is less than the threshold standard deviation.

20 Claims, 9 Drawing Sheets

ADAPTIVE ACCELERATED YIELD ANALYSIS

BACKGROUND

The present invention generally relates to yield analysis, and more specifically, to adaptive accelerated yield analysis.

When analyzing failure issues with complex systems that often have a very small rate of failure, typical approaches include using the Monte Carlo methods. For example, determining a rate at which a circuit fails (i.e., the ratio of the number of failures to the number of samples) when the failure rate is very small (i.e., one in a billion) can be a challenge. The Monte Carlo methods are a broad class of computational algorithms that rely on repeated random sampling to obtain numerical results. The mechanism driving these algorithms utilizes randomness to solve problems that might be deterministic in principle. Monte Carlo methods require every source of statistical variation to be sampled randomly according to the corresponding probability density function of the source of variation.

SUMMARY

Embodiments of the present invention are directed to a computer-implemented method for optimizing simulation output yields. A non-limiting example of the computer-implemented method includes determining a target criteria of a system for statistical analysis, based at least in part on the target criteria, determining a statistical analysis algorithm for the simulation, determining a block size for a plurality of statistical samples of the system for parallelization of the statistical analysis algorithm, generating the plurality of statistical samples of the system, simulating the plurality of statistical samples of the system to determine one or more output yields, calculating a confidence interval for each of the one or more output yields, wherein the confidence interval comprises a lower bound, comparing the lower bound to a threshold standard deviation of a probability density function, and adjusting the block size for the plurality of statistical samples of the system based on determining that the lower bound is less than the threshold standard deviation of the probability density function.

Embodiments of the present invention are directed to a system for optimizing simulation output yields. A non-limiting example of the system includes a processor coupled to a memory, the processor configured to perform determining a target criteria of a system for simulation, based at least in part on the target criteria, determining a statistical analysis algorithm for the simulation, determining a block size for a plurality of statistical samples of the system for the parallelization of the statistical analysis algorithm, generating the plurality of statistical samples of the system, simulating the plurality of statistical samples of the system to determine one or more output yields, calculating a confidence interval for each of the one or more output yields, wherein the confidence interval comprises a lower bound, comparing the lower bound to a threshold standard deviation of a probability density function, and adjusting the block size for the plurality of statistical samples of the system based on determining that the lower bound is less than the threshold standard deviation of the probability density function.

Embodiments of the invention are directed to a computer program product for optimizing simulation output yields, the computer program product comprising a computer readable storage medium having program instructions embodied therewith. The program instructions are executable by a processor to cause the processor to perform a method. A non-limiting example of the method includes determining a target criteria of a system for simulation, based at least in part on the target criteria, determining a statistical analysis algorithm for the simulation, determining a block size for a plurality of statistical samples of the system for parallelization of the statistical analysis algorithm, generating the plurality of statistical samples of the system, simulating the plurality of statistical samples of the system to determine one or more output yields, calculating a confidence interval for each of the one or more output yields, wherein the confidence interval comprises a lower bound, comparing the lower bound to a threshold standard deviation of a probability density function, and adjusting the block size for the plurality of statistical samples of the system based on determining that the lower bound is less than the threshold standard deviation of the probability density function.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
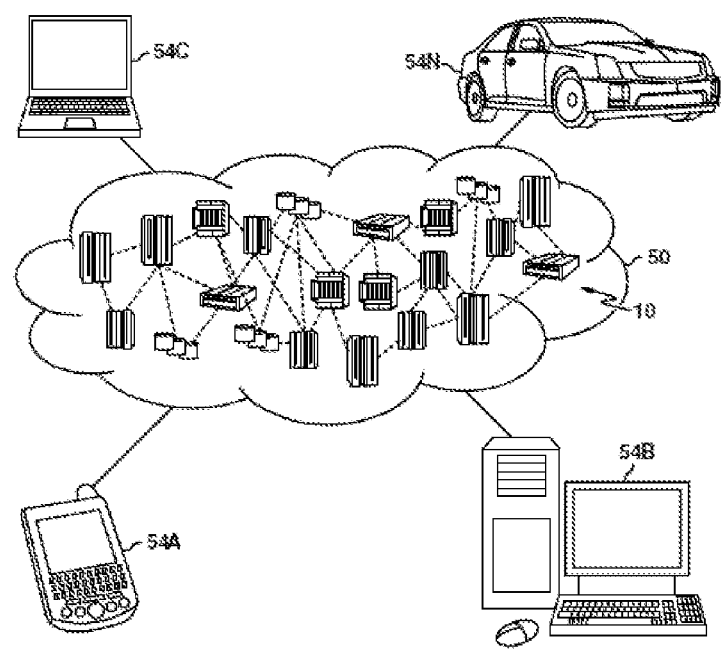
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
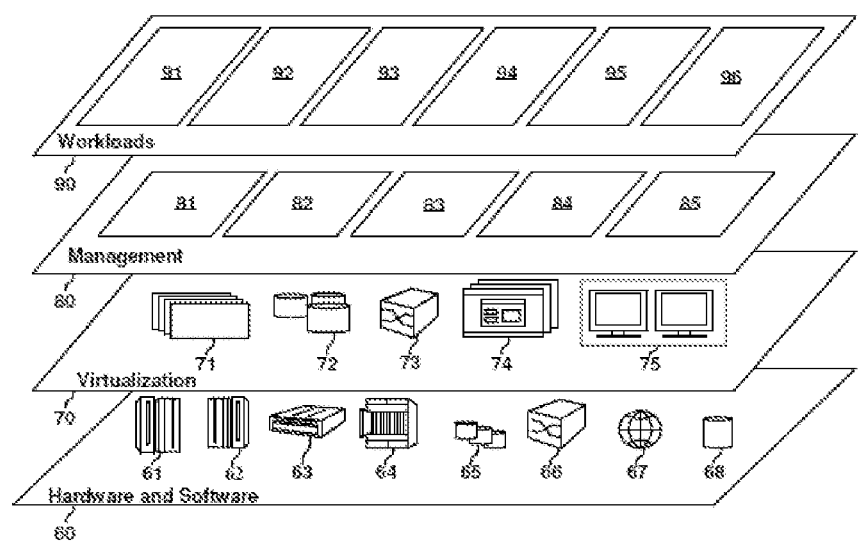
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and adaptive accelerated yield analysis 96.

Figure 3:
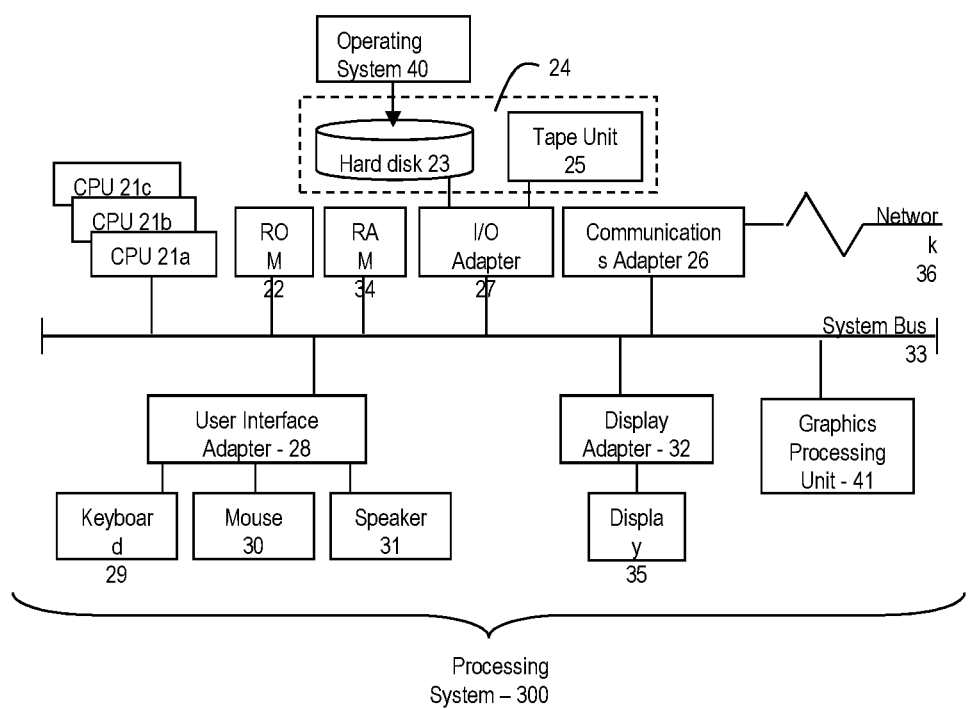
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

Turning now to an overview of technologies that are more specifically relevant to aspects of the invention, when analyzing failure issues with complex systems that often have a very small rate of failure, typical approaches include using the Monte Carlo methods. For example, determining a rate at which a circuit fails (i.e., the ratio of the number of failures to the number of samples) when the failure rate is very small (i.e., one in a billion) can be a challenge. As mentioned above, for determining rates of failures when the failure rate is very small include the use of the Monte Carlo methods in conjunction with a circuit simulator. The Monte Carlo methods are a broad class of computational algorithms that rely on repeated random sampling to obtain numerical results. The mechanism driving these algorithms utilizes randomness to solve problems that might be deterministic in principle. Monte Carlo methods require every source of statistical variation to be sampled randomly according to the corresponding probability density function of the source of variation. Each sample set is simulated with a circuit simulator to determine the pass/fail result of the circuit. The results are tabulated and a failure probability is computed. This can take a prohibitively long period of time when the number of sample numbers is in the billions. Also, finding the overall failure rate, while helpful, does not provide insight into the actual failure mechanism.

In addition to the Monte Carlo methods, other methods can be utilized to address the above-described problem. Particular categories include a quasi Monte Carlo method which yields a more accurate Monte Carlo result using fewer samples. However, this quasi Monte Carlo method suffers from the same issues of traditional Monte Carlo methods when the failure probability becomes very small. The total number of samples that are required can be prohibitive. Another category includes using modified sampling techniques such as, for example, Importance Sampling. The modified sampling techniques do not sample the statistical parameters according to their given distribution but "shifts" the distribution towards the failure regime. This results in more samples being generated around the failure boundary. These techniques have been shown to not work well when the number of statistical sources exceeds more than a few dozen. Modified sampling does not generate accurate results because it becomes difficult to realize how to shift the statistical distribution. Another category includes clustering and dimensionality reduction. These methods involve finding one or more failing regimes, generating a probability density function for each regime, and then creating a hybrid probability density function. These methods are often applied in the context of reducing the number of statistical parameters from 1000s to 10s (e.g., two orders of magnitude) so that clustering methods can be applied. However, this approach suffers from issues surrounding the accuracy and the fact that there could be many easily defined failure regimes or none at all depending on the size and nature of a circuit. In yet another category, performance modeling can be utilized. These methods require the creation of an analytical model for the performance metric of interest and then performing a Monte Carlo analysis. The accuracy of these methods are limited by the accuracy of the generated model, since it is difficult to capture the appropriate statistical dependencies in order to create an accurate model. And finally, another example category includes distribution modeling. These methods assume known standard distributions and attempt to fit known distributions to simulated data. These methods are limited in that actual data do not fit standard distributions—or if they do, it's over a narrow range of validity.

There exists no solution for optimizing the number of statistical samples and how blocks of samples can be distributed over a number of computing processes during a statistical analysis based on one or more target criteria for a system. For example, deterministic systems such as, for example, flipping a coin, do not require a statistical analysis with sample sizes of thousands, millions, or billions of samples. The probability estimates and a confidence interval would determine early on that the probability of a fail (e.g., either a heads or a tails in the coin flip) would converge to 50% failure rate without the need for large scale sampling. As more and more complex systems, such as a circuit topology, are simulated, the cost of the simulation can be expensive. Minimizing the number of simulations and the block size of generated samples can reduce this cost. In addition, generating sample blocks utilizing Monte Carlo sampling requires extensive processing resources for simulation for a circuit simulator, for example. By controlling the sample block size for these types of complex models, less processing resources can be utilized for complex systems. Once the block size is adjusted, additional simulations can be performed utilizing this new block size so that the Monte Carlo samples matches the block size. These simulations can determine a result of the simulation based on the Monte Carlo samples generated for a system. This result of the simulation can be utilized for manufacturing or fabrication of a circuit, for example, when the simulation is for a circuit simulator.

Turning now to an overview of the aspects of the invention, one or more embodiments of the invention address the above-described shortcomings of the prior art by providing systems and method for performing a yield analysis using multiple outputs from a circuit (or other system) and determining which combination of outputs contributes most to the overall failure rate. Outputs that contribute less to the overall failure rate will, by itself, have a smaller failure rate than outputs that contribute more to the overall failure rate. Furthermore, since the difference in failure rates between various outputs can be several orders of magnitude, aspects of the invention include a yield analysis algorithm that can adapt on-the-fly as the statistical analysis proceeds. That is to say, aspects of the invention include an approach for Monte Carlo sampling, that can be adaptive as the sampling occurs, and utilizing a model to determining whether validation is required.

In particular, for applications where there is an expensive validation operation included for the application, such as a circuit simulator, embodiments herein provide for predicting a rate of failure for a particular application and adjusting a model to account for this anticipated failure rate when applying an algorithm. For ease of discussion and illustration, references to the application of circuit simulation will be described herein as an application; however, any application with expensive validation operations can be substituted. Depending on the nature of the pass/fail criteria determined from circuit simulation, failures rates can differ by several orders of magnitude. Because of this large range of failure rates, utilizing a single Monte Carlo method will not yield results efficiently for all pass/fail criteria. That is to say, no single Monte Carlo method/algorithm computes all failure probabilities equally efficiently. Sample counts can span by, for example, 12 orders of magnitude (e.g., 3 to 8 sigma). With respect to circuit simulations, for example, when two gated latches are connected in series, and the enable inputs is inverted in one of the latches, it is possible that due to manufacturing variability the first latch in the series will fail much more frequently than the second latch in the series. Therefore, a pass/fail criteria testing the first latch in may have a much higher failure probability than the second latch. A single Monte Carlo method may compute results for the first latch efficiently but suffer when computing results for the second latch or vis-a-versa.

In one or more embodiments of the invention, a generated model with a tune-able accuracy or a tune-able range of validity is utilized. Embodiments of the generated model includes either some adjustable input settings or an adjustable output setting that allows the algorithm to adapt the accuracy of the generated model as sampling is proceeding. Examples of the algorithm include a support vector classifier (SVC) that provides a pass/fail threshold or a support vector regressor (SVR) that models a continuous output from which one could derive a pass/fail threshold. In the circuit simulation application, the generated model is created for each circuit output. This generated model can be utilized to predict a simulation result and determine if a simulation is required.

Figure 4:
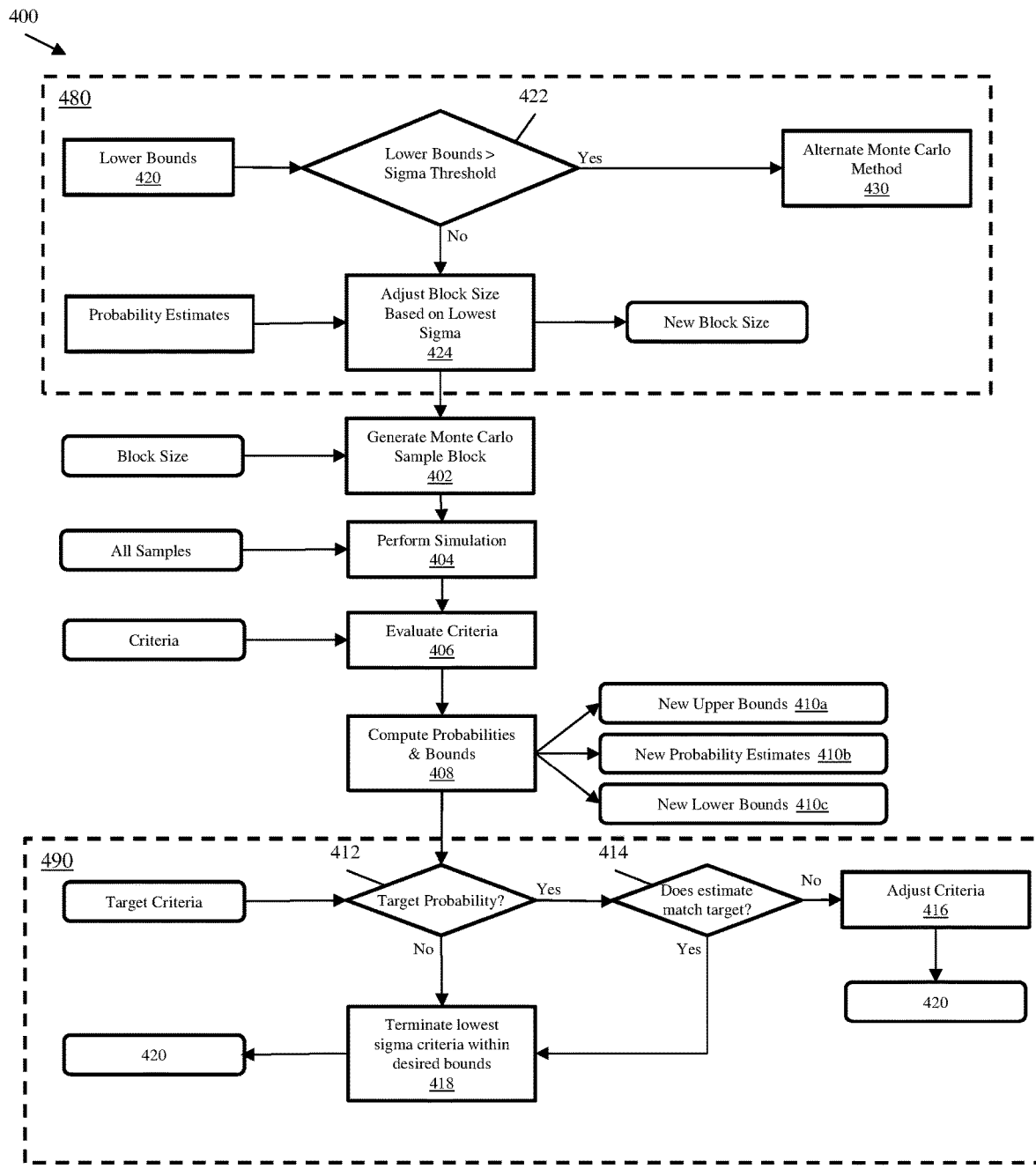
FIG. 4 depicts a block diagram of a process flow for an optimized Monte Carlo method according to embodiments of the invention.

Turning now to a more detailed description of aspects of the present invention, FIG. 4 depicts a block diagram of process flow for an optimized Monte Carlo method according to embodiments of the invention. In one or more embodiments of the invention, the process flow 400 includes the utilization of Monte Carlo methods for simulating an output yield for a plurality of statistical system samples. These system samples can be generated utilizing Monte Carlo sampling methodologies. In the circuit simulation example, the system samples can include a circuit topology where various component attributes vary between the different system samples. For example, for a resistor in a circuit, the resistance value of the resistor may vary as a result of manufacturing variability between system samples. This would affect the performance of the component across system samples and thus the performance and functionality over the overall system. In some embodiments of the invention, an initial statistical analysis can be performed by generating a Monte Carlo sample block of statistical system samples for a system being simulated as shown in process block 402. The sample block size for the statistical system samples can be initially determined by a user of the analysis or determined from techniques explained below. The sample block size can vary by orders of magnitudes (e.g., 100 samples vs. 1,000,000 samples). In process block 404, a simulation is performed utilizing a simulation algorithm utilizing a processing system, such as processing system 300 described in FIG. 3, for example. In some embodiments, the simulation algorithm is a circuit simulation computational algorithm. The simulation algorithm can be determined based on a target criteria for evaluation. The criteria for the simulation can come from a client seeking simulation of the system. The simulation is performed utilizing the sampling block of samples generated in the previous process block 402.

In one or more embodiments of the invention, the target criteria can be failure probabilities or a failure criteria being evaluated as shown in block 406. Based on the target criteria, at process block 408, the process flow 400 computes probability estimates and upper and lower bounds. For computing the probabilities and bounds, a probability density function is created based on outputs (or results) of the simulation for each of the components in the system under statistical analysis. Each value or point in the probability density function can be the result of the simulation on each of the multiple statistical system samples. For example, a block size of 1000 system samples would result in 1000 plotted data points from which a probability density function can be determined. The output or results of the simulation can be, for example, a measurement of a component of a sample circuit such as a delay through a latch. The delay value can be measured in picoseconds and the value can be plotted (e.g., 5 ps, 5.2 ps, etc.). In one or more embodiments, a probability density function is created based on plotted output values of the simulation for each performance criteria in the system. Each performance criteria have their own probability density function based on the plotted simulation outputs across the multiple samples. A confidence interval is calculated to determine the upper bounds 410a and lower bounds 410c of the output of the statistical analysis. In some embodiments, a Wilson confidence score can be utilized to determine the upper 410a and lower 410c bounds. The Wilson score is an estimate on the range of probabilities such that if the statistical analysis were repeated the result would be within the bounds 95% of the time. It is a function of the number of statistical samples and the number of failures. Therefore, the lower bound (in terms of sigma) is an estimate of the maximum failure probability and is used optimize the behavior of the statistical analysis. When given a target failure probability, the estimated failure probability 410b can be determined from the results of the statistical analysis and compared to the target probability. For example, if the target criteria states that any delays through a circuit component above 5.5 ps, then any simulation results above this threshold delay can be counted as a failure. The failure probability estimate 410b is calculated based on the number of failures versus the total sample size of the simulation. In one or more embodiments of the invention, decision block 412 determines whether the target criteria is to determine a failure probability or to determine a threshold value that yields a specified target probability. If the target criteria is to determine a threshold value that yield a specified target probability then the answer to decision block 412 is 'No' which moves to process block 418. At process block 418, the simulation output results are analyzed and the criteria with the lowest sigma (standard deviation) within the desired bounds (upper 410a and lower 410c) is removed from the analysis. That is to say, in the circuit simulation example, any circuit criteria that has a failing probability and a confidence interval (the upper 410a and lower 410c bounds, as calculated in block 408) within a specified tolerance, are removed from further statistical analysis. After this, the process flow 400 moves to block 420 which will discussed in detail further down. In one or more embodiments of the invention, at decision block 412, if the target criteria is a target probability for the simulated samples output, then the answer to decision bock 412 is 'Yes' and the process flow 400 continues to decision block 414. At this point, the probability estimate 410b calculated at block 408 is compared to this target probability. If the target probability (e.g., output yields have a failure probability of the target probability) is met by the probability estimates 410b then the criteria is left unchanged and the analysis continues with block 418. However, if the target probability does not match the probability estimate, then the answer to decision block 414 is 'No' and the process flow 400 proceeds to block 416 where the criteria is adjusted. For example, if a target criteria is to have a three (3) sigma delay failure in the output yield and the threshold delay value yields only a 2.5 sigma delay, then the threshold delay value can be adjusted to attempt to reach a 3 sigma delay failure in the next simulation. After the adjustment to the criteria, the lower bounds 420 are analyzed at decision block 422.

In one or more embodiments, at block 422, the lower bounds from the previous block of statistical samples are analyzed and compared to a threshold sigma value at decision block 422. Herein, the lower bounds 420 are taken from, for example, a Wilson confidence score to determine if and how the block size of samples will need to be adjusted for the next simulation result. If the lower bounds are greater than the sigma threshold, for example, a 5 sigma, then the decision block 422 answer is 'Yes' and the process flow 400 proceeds to block 430 where an alternate Monte Carlo method is utilized for further statistical analysis. However, if the lower bounds 420 are lower than the sigma threshold, the decision block answer is 'No' and the process flow 400 proceeds to block 424 where the sample block size is adjusted for the next simulation at block 402. This process flow 400 can be performed iteratively until the output yield warrants the completion of the statistical analysis. At block 424 the sample block size is adjusted based on the lowest sigma value. This sigma value will indicate how often the simulation is outputting a fail (e.g., 3 sigma is equal to a failure rate of around 27 in 10,000 samples). So if the simulation is failing often, the sample block size does not need to be adjusted to be large. For example, if the lowest sigma is between 1 and 2, then the block size can be about 1000. If the lowest sigma is between 2 and 3, then the block size can be about 10,000. If the lowest sigma is between 3 and 4, the block size can be 1,000,000 samples. Once the block size is adjusted, the process flow 400 repeats and the samples are generated at block 402. For ease of illustration in FIG. 5, process and decision blocks 420, 422, 430, 424 have been grouped into block 480 and process and decision block 412, 414, 416, 418, 450 have been grouped into block 490.

Figure 5:
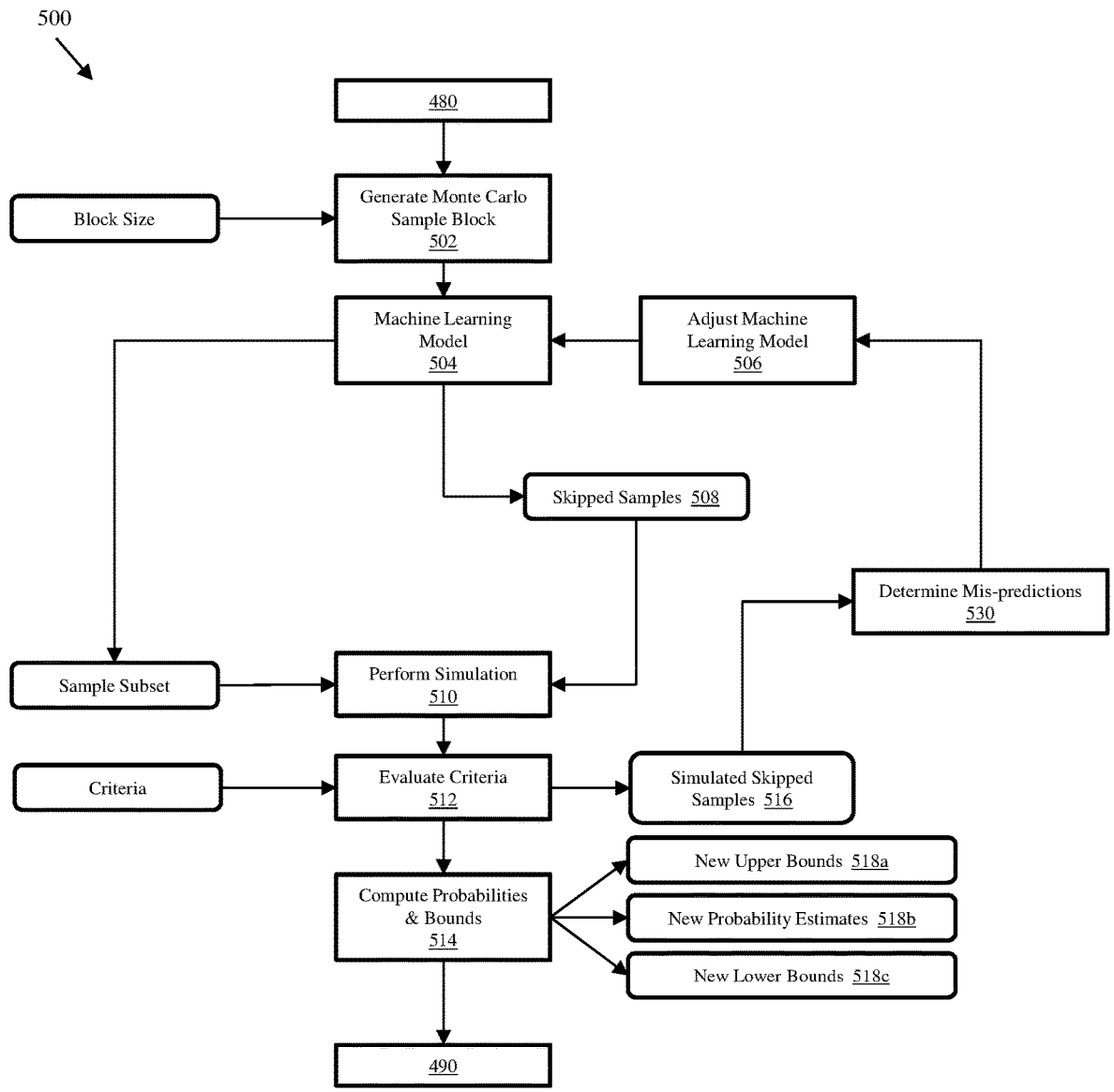
FIG. 5 depicts a process flow for an optimized Monte Carlo method with machine learning according to one or more embodiments of the invention.

FIG. 5 depicts a process flow 500 for an optimized Monte Carlo method with machine learning according to one or more embodiments of the invention. A simulation sampling block of samples for simulation are generated utilizing Monte Carlo methods, as shown in block 502. Prior to any simulations being performed, a machine learning model 504 can be utilized to predict whether the samples need to be simulated by determining or predicting an expected result of the simulation for particular samples. These skipped samples 508 can be stored in a storage device for analysis. In addition, the skipped samples are removed from the sample block to create a sample subset which is then simulated at block 510. The process flow 500 continues similarly to process flow 400 in FIG. 4. However, the machine learning model can be evaluated by performing a simulation on the skipped samples 508 to test the accuracy of the machine learning model. These skipped samples 508 are simulated at process block 510 and then evaluated at block 512 to determine a simulation output for the skipped samples as shown at block 516. These simulated skipped samples 516 are evaluated to determine mis-predictions by the machine learning model in process block 530. Based on any mis-predictions, the machine learning model can be adjusted as shown in block 506. Adjusting the machine learning model can include adjusting any parameters of the machine learning algorithm or by re-training the machine learning model.

Figure 6:
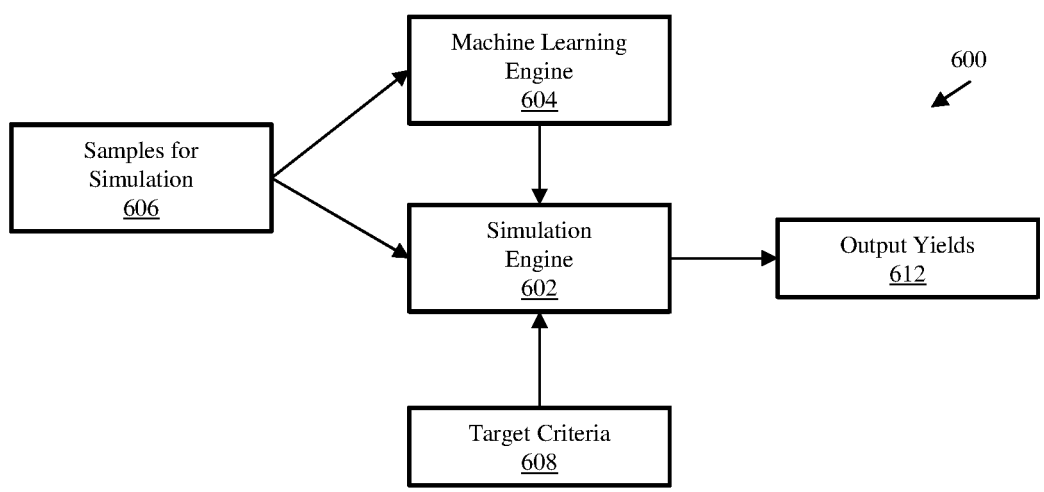
FIG. 6 depicts a block diagram of a system for an optimized Monte Carlo method according to one or more embodiments of the invention.

FIG. 6 depicts a block diagram of a system for an optimized Monte Carlo method according to one or more embodiments of the invention. The system 600 includes a simulation engine 602, a machine learning engine 604, and samples for simulation 606. The simulation engine 602 is configured to simulate the samples 606 and compare the outputs of the sample to a target criteria 608 that can supplied by a client or user of the system 600. The simulation engine 602 is further configured to execute the process flow 400 in FIG. 4 to determine output yields 612. In one or more embodiments of the invention, the machine learning engine 604 can be utilized to predict the outputs of samples 606 and remove these as skipped samples before being inputted into the simulation engine. As described herein, the machine learning engine 604 and the simulation engine 602 can be configured to perform the process flow 500 described in FIG. 5.

In embodiments of the invention, the engines 602 and 604 can also be implemented as so-called classifiers (described in more detail below). In one or more embodiments of the invention, the features of the various engines/classifiers (602 and 604) described herein can be implemented on the processing system 300 shown in FIG. 3, or can be implemented on a neural network (not shown). In embodiments of the invention, the features of the engines/classifiers 602 and 604 can be implemented by configuring and arranging the processing system 300 to execute machine learning (ML) algorithms. In general, ML algorithms, in effect, extract features from received data (e.g., inputs to the engines 602 and 604) in order to "classify" the received data. Examples of suitable classifiers include but are not limited to neural networks (described in greater detail below), support vector machines (SVMs), logistic regression, decision trees, hidden Markov Models (HMMs), etc. The end result of the classifier's operations, i.e., the "classification," is to predict a class for the data. The ML algorithms apply machine learning techniques to the received data in order to, over time, create/train/update a unique "model." The learning or training performed by the engines/classifiers 602 and 604 can be supervised, unsupervised, or a hybrid that includes aspects of supervised and unsupervised learning. Supervised learning is when training data is already available and classified/labeled. Unsupervised learning is when training data is not classified/labeled so must be developed through iterations of the classifier. Unsupervised learning can utilize additional learning/training methods including, for example, clustering, anomaly detection, neural networks, deep learning, and the like.

Figure 7:
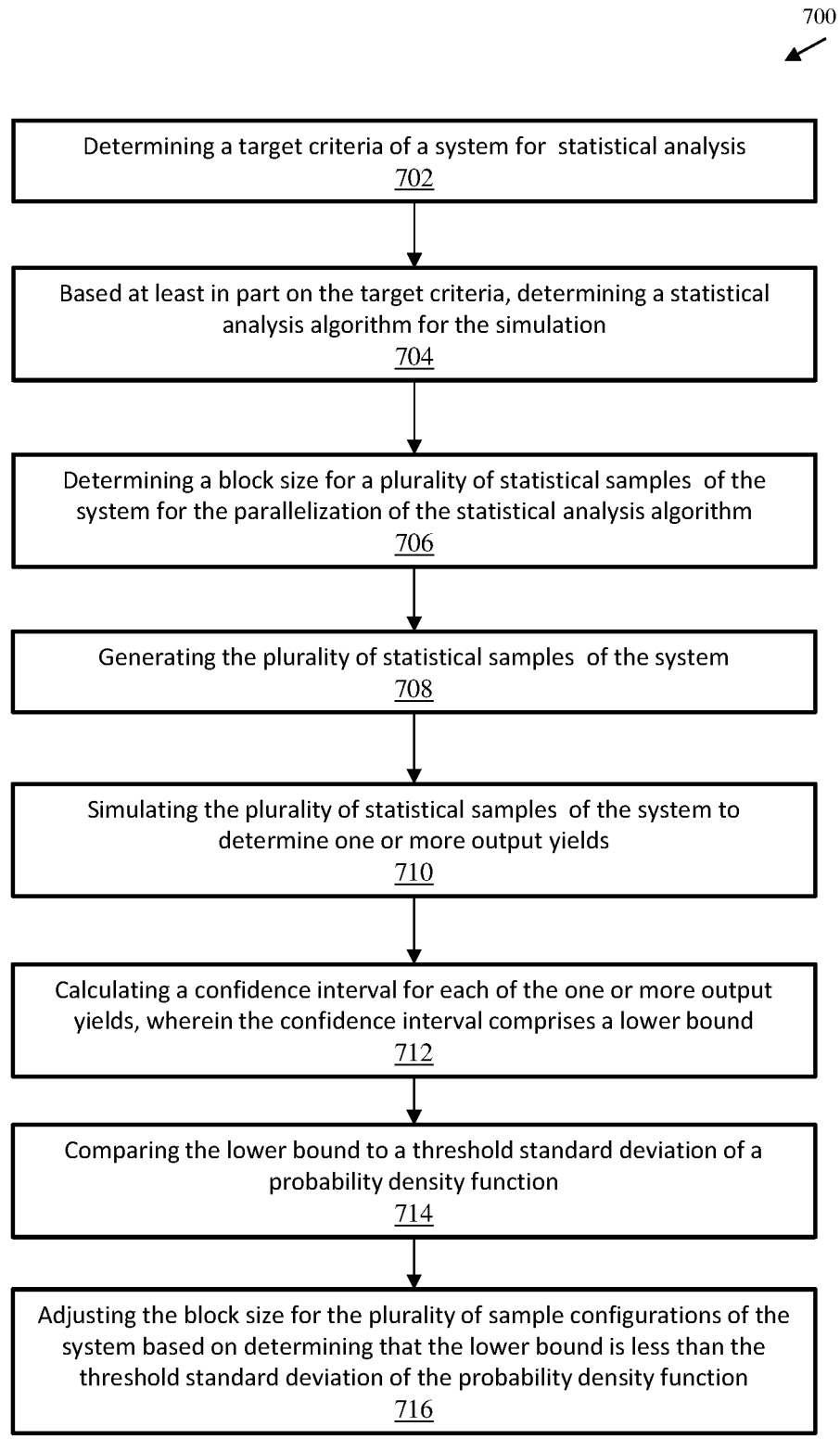
FIG. 7 depicts a flow diagram of a method for optimizing simulation output yields according to one or more embodiments of the invention.

FIG. 7 depicts a flow diagram of a method for optimizing simulation output yields according to one or more embodiments of the invention. The method 700 includes determining a target criteria of a system for statistical analysis, as shown at block 702. Based at least in part on the target criteria, the method 700 includes determining a statistical analysis algorithm for the simulation, as shown in block 704. At block 706, the method 700 includes determining a block size for a plurality of statistical samples of the system for the parallelization of the statistical analysis algorithm. The method 700, at block 708, includes generating the plurality of statistical system samples. And at block 710, the method 700 includes simulating the plurality of statistical system samples to determine one or more output yields. The method 700 includes calculating a confidence interval for each of the one or more output yields, wherein the confidence interval comprises a lower bound, at block 712. The method 700, at block 714, includes comparing the lower bound to a threshold standard deviation of a probability density function. And at block 716, the method 700 includes adjusting the block size for the plurality of statistical system samples of the system based on determining that the lower bound is less than the threshold standard deviation of the probability density function.

Additional processes may also be included. It should be understood that the processes depicted in FIG. 7 represent illustrations, and that other processes may be added or existing processes may be removed, modified, or rearranged without departing from the scope and spirit of the present disclosure.

Figure 8:
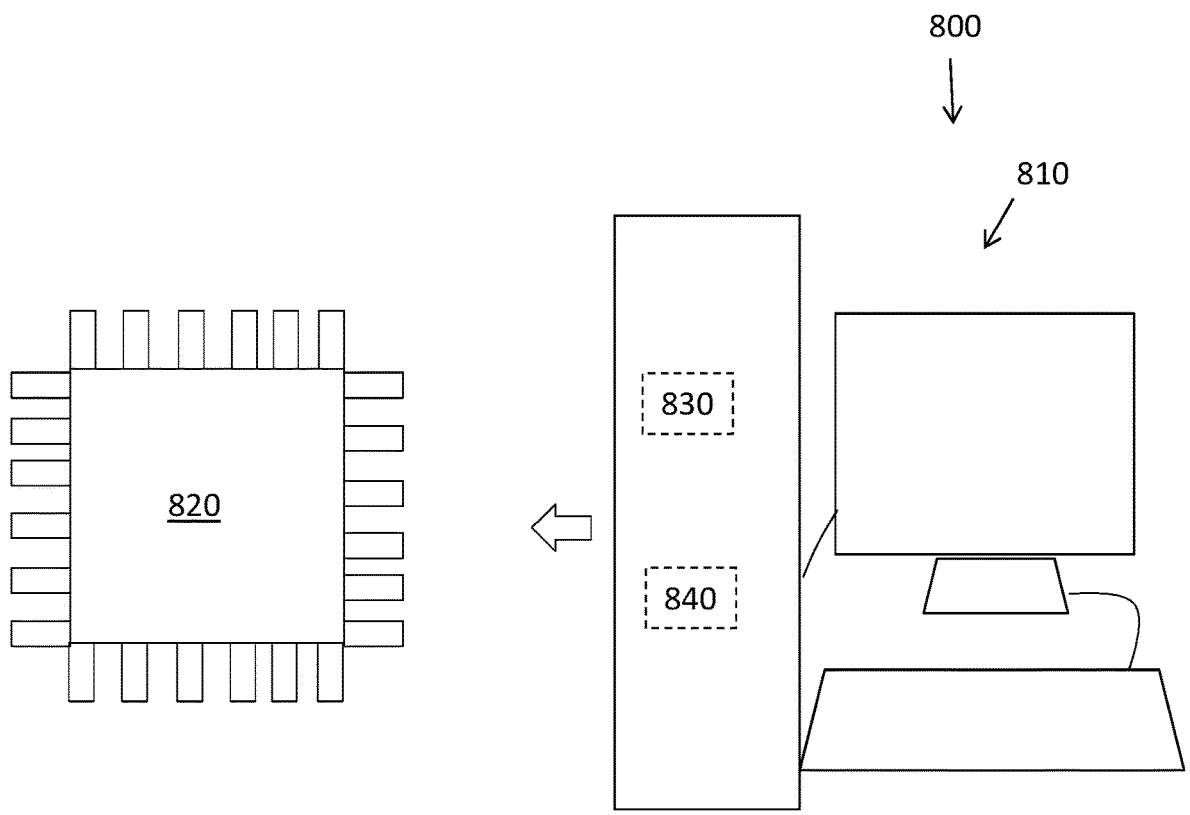
FIG. 8 is a block diagram of a system to perform fabrication of a circuit according to embodiments of the invention.

FIG. 8 is a block diagram of a system 800 to perform fabrication of a circuit according to embodiments of the invention. The system 800 includes processing circuitry 810 used to generate a design (e.g., result of a simulation) that is ultimately fabricated into an integrated circuit 820. The steps involved in the fabrication of the integrated circuit 820 are well-known and briefly described herein. Once the physical layout is finalized, based, in part, on design from the result of the simulation according to embodiments of the invention to facilitate optimization of the routing plan, the finalized physical layout is provided to a foundry. Masks are generated for each layer of the integrated circuit based on the finalized physical layout. Then, the wafer is processed in the sequence of the mask order. The processing includes photolithography and etch. This is further discussed with reference to FIG. 9.

Figure 9:
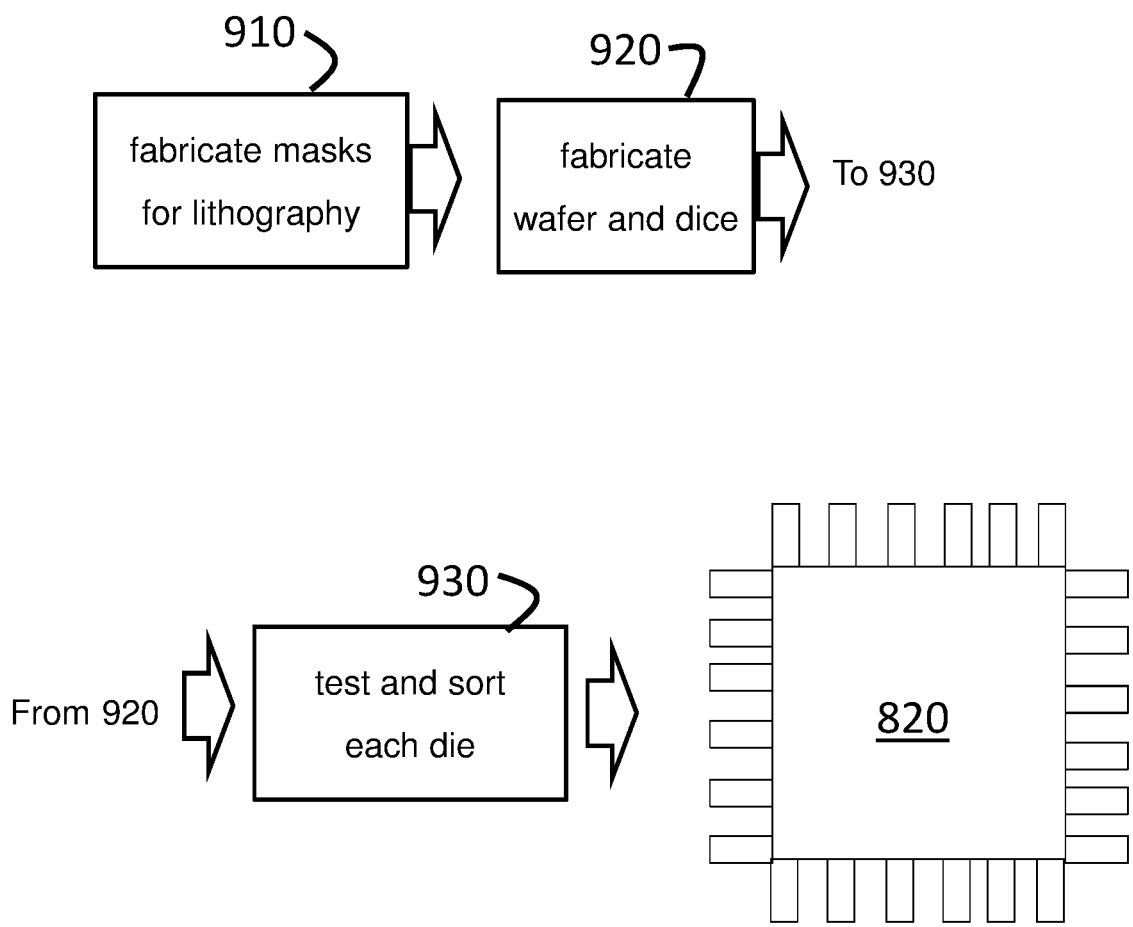
FIG. 9 is a process flow of a method of fabricating the circuit according to exemplary embodiments of the invention.

FIG. 9 is a process flow of a method of fabricating the circuit according to exemplary embodiments of the invention. Once the physical design data is obtained, based, in part, on the result of the simulation, the integrated circuit 820 can be fabricated according to known processes that are generally described with reference to FIG. 9. Generally, a wafer with multiple copies of the final design is fabricated and cut (i.e., diced) such that each die is one copy of the integrated circuit 820. At block 910, the processes include fabricating masks for lithography based on the finalized physical layout. At block 920, fabricating the wafer includes using the masks to perform photolithography and etching. Once the wafer is diced, testing and sorting each die is performed, at block 930, to filter out any faulty die.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for optimizing statistical methods of computing output yields, the method comprising:
    determining a target criteria of a circuit design for statistical analysis;
    based at least in part on the target criteria, determining a statistical analysis algorithm for the statistical analysis;
    determining a block size for a plurality of statistical samples of the circuit design for a parallelization of the statistical analysis algorithm;
    generating the plurality of statistical samples of the circuit design;
    simulating the plurality of statistical samples of the circuit design to determine one or more output yields;
    calculating a confidence interval for each of the one or more output yields, wherein the confidence interval comprises a lower bound;
    comparing the lower bound to a threshold standard deviation of a probability density function;
    adjusting the block size for the plurality of statistical samples of the circuit design based on determining that the lower bound is less than the threshold standard deviation of the probability density function;
    generating a block of new statistical samples of the circuit design, wherein the block comprises the adjust block size;
    performing a simulation utilizing the block of new statistical samples of the circuit design;
    determining a result of the simulation; and
    manufacturing a circuit based on based on the result of the simulation.

2. The computer-implemented method of claim 1, further comprising:
    determining that the target criteria comprises a target failure probability;
    determining a failure rate for a first output yield of the one or more output yields, wherein the failure rate for the first output yield is determined based on comparing the first output yield to a failure threshold;
    based at least in part on the determining that the failure rate of the first output yield does not match the target failure probability, adjusting the failure threshold.

3. The computer-implemented method of claim 1, further comprising:
    determining that the target criteria comprises a target output yield;
    comparing a first output yield of the one or more output yields to the target output yield;
    based at least in part on determining that the first output yield is greater than the target output yield, removing the first output yield from the statistical analysis.

4. The computer-implemented method of claim 1, further comprising:
    determining a second statistical analysis algorithm based on determining that the lower bound is greater than the threshold standard deviation of the probability density function.

5. The computer-implemented method of claim 1, further comprising:
    analyzing, using a machine learning model, the plurality of statistical samples of the circuit design for the statistical analysis algorithm;
    predicting, by the machine learning model, one or more statistical samples of the plurality of samples of the circuit design that satisfy the target criteria;
    removing one or more target criteria from one or more target criteria of the circuit design.

6. The computer-implemented method of claim 5, further comprising:
    storing the one or more statistical samples in a memory;
    simulating the one or more statistical samples to determine output yields for the one or more sample configurations; and
    based on the output yields of the one or more of the target criteria, adjusting one or more parameters of the machine learning model.

7. The computer-implemented method of claim 1, further comprising:
    modifying the statistical analysis algorithm based on determining that the lower bound is greater than the threshold standard deviation of the probability density function.

8. The computer-implemented method of claim 1, wherein the confidence interval comprises a Wilson score interval.

9. The computer-implemented method of claim 1, wherein the probability density function comprises a normal distribution of historical output yields of historical simulations.

10. The computer-implemented method of claim 1, wherein the statistical analysis algorithm comprises a Monte Carlo method computational algorithm.

11. The computer-implemented method of claim 1, wherein the statistical analysis comprises a circuit simulation.

12. A system for optimizing statistical methods of computing output yields, the system comprising:
a processor communicatively coupled to a memory, the processor configured to:
determine a target criteria of a circuit design for statistical analysis;
based at least in part on the target criteria, determine a statistical analysis algorithm for the statistical analysis;
determine a block size for a plurality of statistical samples of the circuit design for a parallelization of the statistical analysis algorithm;
generate the plurality of statistical samples of the circuit design;
simulate the plurality of statistical samples of the circuit design to determine one or more output yields;
calculate a confidence interval for each of the one or more output yields, wherein the confidence interval comprises a lower bound;
compare the lower bound to a threshold standard deviation of a probability density function;
adjust the block size for the plurality of statistical samples of the circuit design based on determining that the lower bound is less than the threshold standard deviation of the probability density function;
generate a block of new statistical samples of the circuit design, wherein the block comprises the adjust block size;
perform a simulation utilizing the block of new statistical samples of the circuit design; and
determine a result of the simulation; and
manufacturing a circuit based on based on the result of the simulation.

13. The system of claim 12, wherein the processor is further configured to:
determine that the target criteria comprises a target failure probability;
determine a failure rate for a first output yield of the one or more output yields, wherein the failure rate for the first output yield is determined based on comparing the first output yield to a failure threshold;
based at least in part on the determining that the failure rate of the first output yield does not match the target failure probability, adjust the failure threshold.

14. The system of claim 12, wherein the processor is further configured to:
determine that the target criteria comprises a target output yield;
compare a first output yield of the one or more output yields to the target output yield;
based at least in part on determining that the first output yield is greater than the target output yield, remove the first output yield from the statistical analysis.

15. The system of claim 12, wherein the processor is further configured to:
determine a second statistical analysis algorithm based on determining that the lower bound is greater than the threshold standard deviation of the probability density function.

16. A computer program product for optimizing simulation output yields comprising a computer readable storage medium having program instructions embodied therewith, the program instructions executable by a processor to cause the processor to perform a method comprising:
determining a target criteria of a circuit design for statistical analysis;
based at least in part on the target criteria, determining a statistical analysis algorithm for the statistical analysis;
determining a block size for a plurality of statistical samples of the circuit design for a parallelization of the statistical analysis algorithm;
generating the plurality of statistical samples of the circuit design;
simulating the plurality of statistical samples of the circuit design to determine one or more output yields;
calculating a confidence interval for each of the one or more output yields, wherein the confidence interval comprises a lower bound;
comparing the lower bound to a threshold standard deviation of a probability density function;
adjusting the block size for the plurality of statistical samples of the circuit design based on determining that the lower bound is less than the threshold standard deviation of the probability density function;
generating a block of new statistical samples of the circuit design, wherein the block comprises the adjust block size;
performing a simulation utilizing the block of new statistical samples of the circuit design;
determining a result of the simulation; and
manufacturing a circuit based on based on the result of the simulation.

17. The computer program product of claim 16, further comprising:
determining that the target criteria comprises a target failure probability;
determining a failure rate for a first output yield of the one or more output yields, wherein the failure rate for the first output yield is determined based on comparing the first output yield to a failure threshold;
based at least in part on the determining that the failure rate of the first output yield does not match the target failure probability, adjusting the failure threshold.

18. The computer program product of claim 16, further comprising:
determining that the target criteria comprises a target output yield;
comparing a first output yield of the one or more output yields to the target output yield;
based at least in part on determining that the first output yield is greater than the target output yield, removing the first output yield from the statistical analysis.

19. The computer program product of claim 16, further comprising:
determining a second simulation algorithm based on determining that the lower bound is greater than the threshold standard deviation of the probability density function.

20. The computer program product of claim 16, further comprising:
analyzing, using a machine learning model, the plurality of statistical samples of the circuit design for the statistical analysis algorithm;
predicting, by the machine learning model, one or more statistical samples of the plurality of statistical samples of the circuit design that satisfy the target criteria;
removing the one or more statistical samples from one or more target criteria of the circuit design.

* * * * *